US008744606B2

(12) United States Patent
Münch et al.

(10) Patent No.: US 8,744,606 B2
(45) Date of Patent: Jun. 3, 2014

(54) RECEIVING DEVICE AND A METHOD FOR PLAYBACK IN A MOBILE RECEIVER

(75) Inventors: Tobias Münch, Straubenhardt (DE); Philipp Schmauderer, Höfen (DE); Christoph Benz, Ohlsbach (DE); Andreas Körner, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 617 days.

(21) Appl. No.: 13/021,111

(22) Filed: Feb. 4, 2011

(65) Prior Publication Data

US 2011/0202153 A1 Aug. 18, 2011

(30) Foreign Application Priority Data

Feb. 5, 2010 (EP) .................................... 10001199

(51) Int. Cl.
*G06F 17/00* (2006.01)
*H04B 15/00* (2006.01)

(52) U.S. Cl.
USPC ............................................ 700/94; 381/94.1

(58) Field of Classification Search
CPC ........ H04H 60/12; H04H 60/37; H04H 60/47
USPC ............. 381/77, 2, 80, 85, 98, 56, 94.2, 94.3; 700/94; 714/710
See application file for complete search history.

(56) References Cited

U.S. PATENT DOCUMENTS

2003/0126974 A1* 7/2003 Ishiwaka et al. ................ 84/615
2006/0025206 A1* 2/2006 Walker et al. ................... 463/20
2006/0169125 A1 8/2006 Ashkenazi et al.
2007/0190928 A1 8/2007 Nichols et al.
2009/0183199 A1* 7/2009 Stafford et al. ................. 725/34
2011/0081027 A1* 4/2011 Densham et al. ............. 381/107

FOREIGN PATENT DOCUMENTS

CN 101385019 A 3/2009
JP 2003-208184 A 7/2003
JP 2007-295468 A 11/2007
JP 2009-206694 A 9/2009

OTHER PUBLICATIONS

European Search Report for corresponding Application No. 10001199.8, mailed Jun. 16, 2010, 6 pages.
Chinese Office Action for corresponding Chinese Application No. 201110033654.0, mailed Mar. 25, 2013, 12 pages.

* cited by examiner

*Primary Examiner* — Simon Sing
*Assistant Examiner* — Eugene Zhao
(74) *Attorney, Agent, or Firm* — Brooks Kushman P.C.

(57) ABSTRACT

A receiving device for mobile reception of a receive signal including an audio signal associated with a currently received piece of music, and a method for playback in a mobile receiver are disclosed. A receiving circuit receives the receive signal and outputs the audio signal and information associated with the audio signal. The information includes one or more information fields associated with the currently received piece of music. An arithmetic unit evaluates the information associated with the audio signal. A database is configured for storing database entries. Each database entry includes data fields and associated audio data. The arithmetic unit assigns the information to an assigned database entry by comparing the information fields with the data fields. The arithmetic unit outputs the audio data of the assigned database entry based on a detected disturbance in the reception of the audio signal.

25 Claims, 3 Drawing Sheets

RECEIVING DEVICE AND A METHOD FOR PLAYBACK IN A MOBILE RECEIVER

RELATED APPLICATIONS

This application claims priority to European Patent Application Serial Number 10 001 199.8, filed on Feb. 5, 2010, titled RECEIVING DEVICE AND A METHOD FOR PLAYBACK IN A MOBILE RECEIVER, which application is incorporated by reference in its entirety in this application.

BACKGROUND OF THE INVENTION

1. Field of the Invention

The present invention relates to a mobile receiving device and a method for audio playback in a mobile receiver.

2. Related Art

German Pat. Appl. No. DE 101 11 590 A1 discloses a method and a circuit arrangement for demodulating a Radio Data System (RDS) signal. The RDS has been introduced for very high frequency radio stations to transmit data to a radio receiver. The transmitted data may contain information about the radio stations and the programs broadcasted by them. This data may be displayed on an optical display.

RDS data may include, for example, various forms of information: program identification (PI), which indicates the received program or the name of the tuned-in station; program type identification (PTY), which indicates the type of program received (e.g., music, news, etc.); traffic announcements (TA); or radio text (RT), which may contain program-related information such as information on the pieces of music, artist, program changes, and the like.

The RDS is used principally in conjunction with car radios. For example, when the reception of a station that is currently tuned in deteriorates, RDS-capable car radios may automatically switch over to a better (or best) receivable radio station broadcasting the same program. The information required to perform this switch over to a better radio station is the PI information and a list of alternative frequencies (AF) being broadcast by RDS-capable radio stations. An RDS signal is a binary signal that consists of a continuous binary data stream with a bit rate of 1.1875 kbits/s.

European Pat. Appl. No. EP 1 274 175 A2 discloses a method for checking the reception quality of a station at alternative reception frequencies in a car radio receiver. To make the checking of the reception quality at an alternative reception frequency as inaudible as possible, a substitute signal is utilized while the receiver is tuned to an alternative reception frequency. The substitute signal is utilized instead of muting the car's radio receiver. A noise signal or part of the already playbacked audio signal may be suitable as the substitute signal.

Furthermore, receivers are known that may be connected to the Internet over a wireless connection (e.g., WLAN, UMTS) and receive programs as live streams (Ogg, etc.) over the wireless connection.

United States Pat. App. Pub. No. US 2007/0190928 A1 discloses a method for providing content to a device. A discovery module may be used to generate playlists of the content of a database that are similar to the channels received by the device from content providers. If the content received includes a channel dedicated to jazz music, for example, then the discovery module may generate a playlist from the content of the database that may be similar to the channel dedicated to jazz music. When the device loses the satellite signal, the device may begin playing an appropriate playlist. The discovery module includes a scanning engine, a playlist module, and a content loading module. The playlist module may be based on programming associated with a content provider. The playlist module may be updated or modified at any time. A satellite radio content provider may provide multiple channels of content. The playlist module may be based on the programming style of the channels generated and transmitted by the content provider. The programming style of the channels may be embodied as rules. The rules themselves may be updated as the content of the database or channels change with time.

In view of the foregoing, there is an ongoing need for providing improved receiving devices and methods for playback in mobile receivers. In particular, there is a need for providing receiving devices and methods of playback that reduce or eliminate interruptions in audio playback when disturbances occur in the reception of a currently received audio signal.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a receiving device is provided for mobile reception of a receive signal that includes an audio signal of a currently received piece of music. The receiving device includes a receiving circuit configured for receiving the receive signal and outputting the audio signal and information associated with the audio signal. The information includes at least one information field describing the currently received piece of music. The receiving device includes an arithmetic unit configured for evaluating the information associated with the audio signal. The receiving device includes a database configured for storing database entries. Each database entry includes at least one data field and associated audio data. The arithmetic unit is further configured for assigning the information to at least one database entry by comparing the at least one information field to the at least one data field. The arithmetic unit is further configured for outputting the audio data of the assigned database entry for playback by the receiving device based on a detected disturbance in the reception of the audio signal associated with the currently received piece of music.

According to another implementation, a method for audio playback in a mobile receiver is provided. A receive signal is received by a receiving circuit. The receive signal includes an audio signal of a currently received piece of music and information associated with the audio signal. The information includes at least one information field describing the currently received piece of music. At least one database entry in a database is assigned to the information by comparing at least one information field to the content of the at least one database entry. Each database entry includes at least one data field and associated audio data. A disturbance in the reception of the audio signal of the currently received piece of music is detected. At least during the disturbance, audio data from the assigned database entry is output for playback by the mobile receiver.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
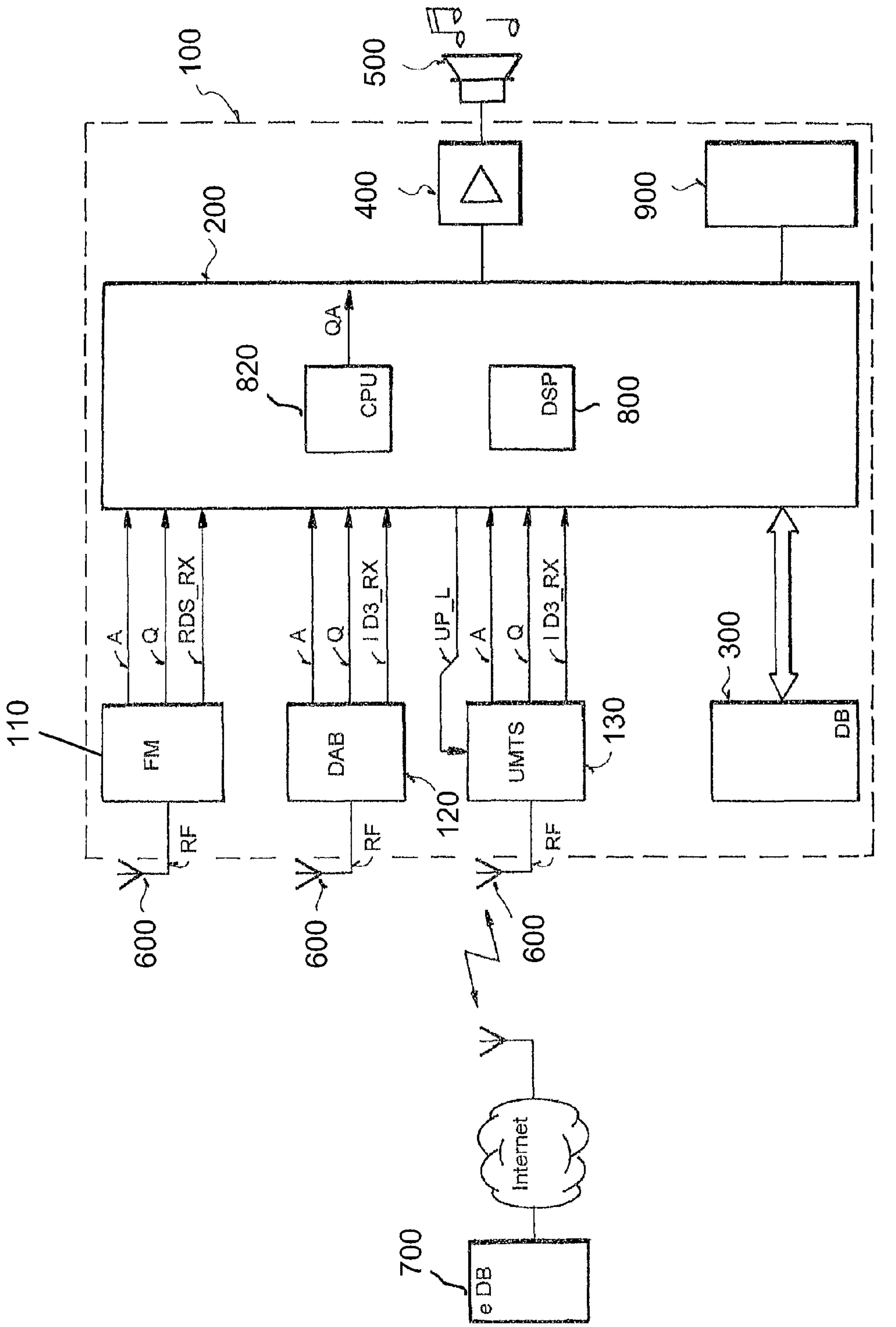
FIG. 1 is a schematic flowchart of an example of a receiving device according to one implementation of the present invention.

FIG. 1 is a schematic flowchart of an example of a receiving device 100 according to one implementation of the present invention. The receiving device 100 (or "receiver" or "mobile receiver") is shown schematically in FIG. 1 by a block diagram. The receiving device 100 may include one or more receiving circuits 110, 120 and/or 130, each of which enables radio reception of a receive signal ("RF" signal) via an antenna 600. The first receiving circuit 110 may include an FM receiver (or very high frequency ("VHF") receiver), which is configured for outputting an audio signal A corresponding to a currently received piece of music, quality information Q, and digital information RDS_RX, which describes the content of the audio signal A. As shown in FIG. 1, the digital information RDS_RX output by the first receiving circuit 110 may be output via an RDS signal. For example, the "title," "artist," and/or "album" of a currently received piece of music may be included in the RDS signal.

The second receiving circuit 120 may include a Digital Audio Broadcasting ("DAB") receiver, which is configured for outputting an audio signal A, quality information Q, and information ID3_RX. The information ID3_RX output by the second receiving circuit 120 describes the audio signal A in the form of an ID3 tag associated with a currently received piece of music. The third receiving circuit 130 may include a Universal Mobile Telecommunications System ("UMTS") receiver and transmitter. The third receiving circuit 130 may be configured for outputting an audio signal A (in mp3 streaming format, for example), quality information Q, and information ID3_RX. The information ID3_RX output by the third receiving circuit 130 describes the audio signal A in the form of an ID3 tag associated with the currently received piece of music. As will be described in greater detail below, the receiving circuits 110, 120 and 130 may communicate with an arithmetic unit (or arithmetic logic unit (ALU), or computer) 200, which may include a processor ("CPU") 820 and a digital signal processor ("DSP") 800. The arithmetic unit 200 may temporarily store the information RDS_RX and/or ID3_RX. An uplink may be present between the arithmetic unit 200 and the UMTS receiver 130, so that the arithmetic unit 200 may access the Internet via the uplink connection UP_L.

The receiving device 100 may further include a local, internal database ("DB") 300, an amplifier arrangement 400 configured for communicating with one or more loudspeakers 500, and a display unit (or display) 900. When a piece of music is received (via a receive signal RF) by the receiving circuit 110, 120 or 130, as much information as possible is collected (and evaluated, as described below) by the arithmetic unit 200 regarding the content of the currently received piece of music. The arithmetic unit 200 may be configured for the input and temporary storage of the information RDS_RX and ID3_RX (e.g., in the memory of CPU 820). In the case of the first receiving circuit 110 (e.g., an FM analog radio receiver), the collected information RDS_RX may include Radio Text Plus ("RT+") information, such as the "title" and "artist" of the currently received piece of music. In the case of the second receiving circuit 120 or the third receiving circuit 130 (e.g., receivers of digital radio stations, such as Internet radio), the collected information ID3_RX may include an ID3 tag containing the "title," "artist," "album," and/or "genre" associated with the currently received piece of music. If no information is broadcasted with the receive signal RF, a part of the audio signal A may be sent to an internal database (e.g., DB 300) or an external database (e.g., the external database Gracenote®) using the uplink connection UP_L. The part of the audio signal A that is sent to the internal or external database may be analyzed (e.g., using what is known to those skilled in the art as an "Auto-Tag tool") and the corresponding information (e.g., an Auto-Tag) may be sent back to the receiving device 100 using the third receiving circuit 130 and output to the arithmetic unit 200.

An algorithm of the arithmetic unit 200 may be used to compare the information RDS_RX or ID3_RX with the content of the local database 300 (which is described in greater detail below). As an alternative to (or in combination with) the local database 300, an external database ("eDB") 700 may be accessed when a UMTS connection with the Internet is established. The connection between the receiving device 100 and eDB 700 may be wired or wireless. Although the discussion below primarily focuses on the local database 300, it will be understood that external database 700 may be used interchangeably with, or in combination with, the local database 300 in the implementations discussed below.

By means of the DSP 800, for example, the algorithm may determine the similarity between two audio signals (e.g., audio signal A and audio data stored in DB 300) by determining the instrument(s) and/or rhythm associated with each audio signal. The algorithm may be used by the arithmetic unit 200 to provide a prioritized list of pieces of music which may be present in the local contents of DB 300, for example, and which may be suitable for replacing the currently received piece of music in the event the audio signal A stream breaks off, or is otherwise interrupted. The breaking off of the audio signal A stream may be determined, for example, on the basis of the quality signal Q output by the receiving circuit 110, 120 or 130, or a quality of the audio signal ("QA") determined by the arithmetic unit 200.

The prioritized list of pieces of music may include a priority property, which is discussed below in further detail in conjunction with FIG. 3. When comparing the currently received piece of music to pieces of music present in the local contents of the DB 300, if the DB 300 contains a piece of music that is identical to the currently received piece of music, the identical piece of music may receive the top priority or the top ranking. Priority properties may include, for example: (1) a piece of music by the same artist; (2) a piece of music by another artist with the same (or similar) title; and/or (3) a piece of music in the same genre.

In some implementations, a user may set the priority property. In some implementations, if the audio signal A in fact breaks off, an inaudible fading may be calculated by means of an intelligent fading algorithm when the same piece of music is locally present in the contents of the DB 300. An intelligent fading may be calculated when a different piece of music (locally present in the contents of DB 300) is to be utilized. In some implementations, the currently received piece of music may simply be faded out, and then a new piece of music in DB 300 is faded in. In some implementations, the pieces of music (i.e., the currently received piece of music and the piece of music present in the local contents of the DB 300) may be cross-faded. In some implementations, the property "bpm" (beats per minute) may be set as the priority property for cross-fading in order to achieve beat synchronization; i.e., a locally-stored piece of music that has the same (or the most similar) rhythm and/or beats per minute as the currently received piece of music may be given top priority for cross-fading with the currently received piece of music. The changing or cross-fading to a piece of music in the local database 300 may be indicated by the display 900.

The reception situation (e.g., the quality of the received audio signal A) may be reevaluated within suitable time windows and a decision may be made by the arithmetic unit 200 automatically, which enables a return to the received radio content (i.e., audio signal A) after or before the piece of music from the local database 300 has ended. In some implementations, a broadcasted and received radio program may be replaced by content in the local database 300 when the broadcasted radio program does not correspond to the listener's taste, for example. In some implementations, spoken content may be replaced by music content, for example.

Figure 2:
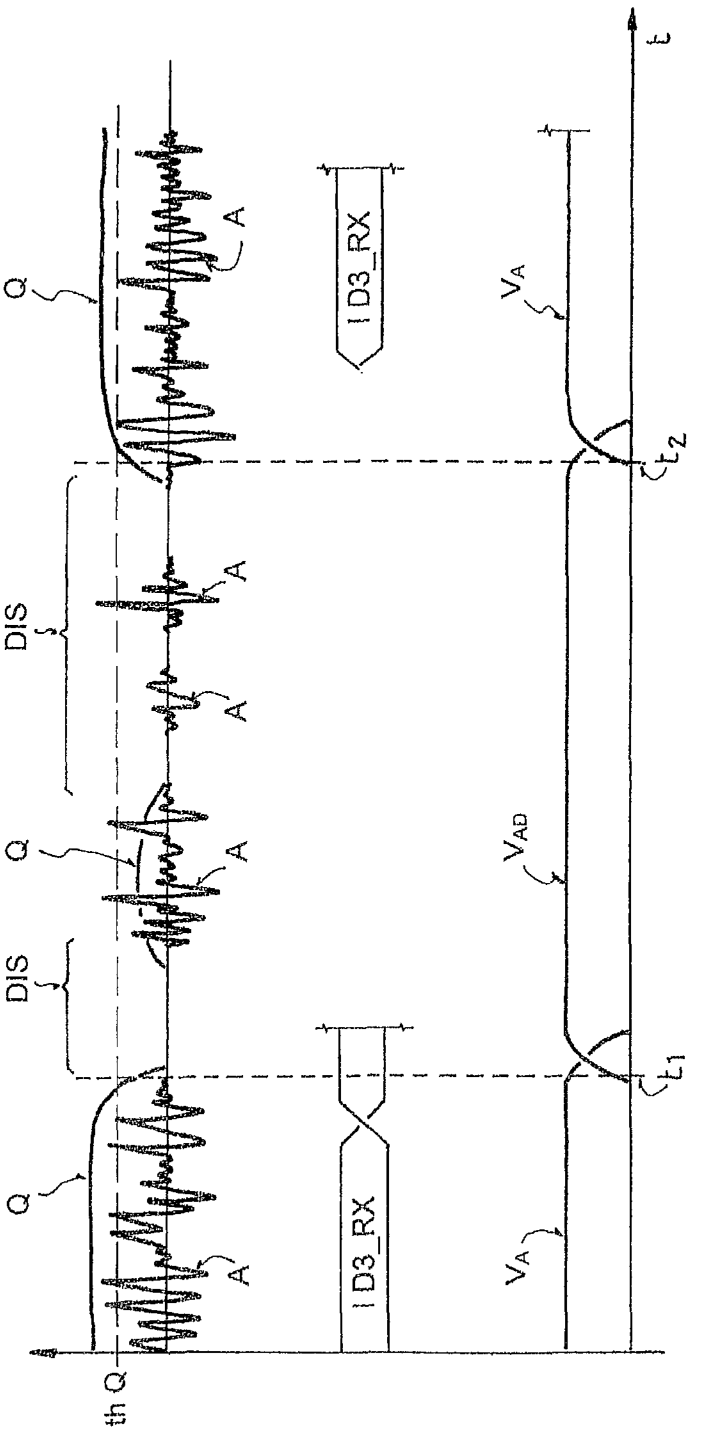
FIG. 2 is a schematic diagram of an example of a time window for evaluating reception of a receive signal according to an implementation of the present invention.

FIG. 2 is a schematic diagram of an example of a time window for evaluating reception of a receive signal according to one implementation. FIG. 2 illustrates quality information over a specified period of time t. The audio signal A is output by the receiving circuit 110, 120 or 130 (FIG. 1) during reception of the receive signal RF. Before time point t1, the quality Q of the receive signal RF is greater than the quality threshold thQ, such that a noise-free audio signal A may be output to the arithmetic unit 200 (FIG. 1). Accordingly, to set the audio volume of the audio signal A, the control signal $V_A$ may be adjusted to a constant value; e.g., to a maximum. During the reception, information ID3_RX associated with the currently received piece of music may be received and temporarily stored by the arithmetic unit 200. At least one database entry in database 300 (FIG. 1) may be assigned to the information ID3_RX. The assignment method will be described in greater detail below with reference to the implementation illustrated in FIG. 3.

At time point t1, a disturbance DIS occurs for the first time, which results in the termination of the audio signal A. A disturbance DIS of this type may be caused, for example, by deterioration of the reception of the receive signal RF. Deterioration of the reception of the receive signal RF may occur, for example, when a motor vehicle in which the receiver 100 (FIG. 1) is working drives through a tunnel, or when the mobile receiver 100 leaves the reception range of the receive signal RF briefly or permanently. A disturbance DIS in the reception of the receive signal RF associated with the currently received piece of music may be detected, for example, by the receiving circuit 110, 120 or 130 (FIG. 1) and/or the arithmetic unit 200 (FIG. 1). For detecting a disturbance DIS, the arithmetic unit 200 or the receiving circuit 110, 120 or 130 may be configured for determining a quality based on a receive signal field strength, a quality signal LQI (link quality indicator), or the like. Alternatively, or in combination, the receiving circuit 110, 120 or 130 and/or the arithmetic unit 200 may be configured for determining a quality of the audio signal A associated with the currently received piece of music. The quality of the audio signal A may be determined, for example, based on a detection of an interruption of the audio signal A, or an evaluation of the amplitude or the noise associated with the audio signal A. As discussed below, a signal Q corresponding to the quality of the audio signal A may be compared with a quality threshold. When the disturbance DIS occurs, the receiving device 100 may cross-fade from the audio signal A to the assigned audio data in the database 300 (FIG. 1). It will be understood that in some implementations, the assignment of content in database 300 to information may occur continuously (i.e., the audio signal A may be buffered continuously). In some implementations, the assignment may commence upon detecting a disturbance DIS; i.e., the assignment may be carried out during output of the buffered audio signal A. For example, the quality Q of the receive signal RF may be compared with a quality threshold thQ (i.e., a threshold quality value comparison). If the quality Q of the receive signal RF falls below the quality threshold thQ, the audio volume $V_A$ of the audio signal A may be reduced. At the same time, the audio volume $V_{AD}$ associated with audio data in the database 300 may be increased, thus outputting audio data in the database 300 for playback. There may be no pause (or a very short pause) in the audio playback during this cross-fading process. The arithmetic unit 200 may be configured for adjusting the audio data to a current clock and/or to a speed of the audio signal A by the DSP 800 (FIG. 1), for example.

Continuing with the description of FIG. 2, between time points t1 and t2, several disturbances DIS occur, whereby the quality Q of the receive signal RF does not exceed the quality threshold thQ, such that the assigned audio data may continue to be output for playback by the receiver 100 (FIG. 1). At time point t2, the quality Q again exceeds the quality threshold thQ, such that cross-fading may occur from the output of the audio data in the database 300 (FIG. 1) to the audio signal A. Alternatively, switching may be carried out between the two signal sources, which may result in a short audio playback pause. The arithmetic unit 200 (FIG. 1) may be configured for cross-fading or switching from the audio signal A to the audio data in the database 300, and thus causing the received audio signal A and/or the audio data in the database 300 to be output by the receiving device 100 for audio playback; e.g., via loudspeakers 500 (FIG. 1). In some implementations, switching and/or cross-fading may occur at the end of the output of the audio data. Outputting audio data from the database 300 may be ended when an end of the disturbance DIS has been detected. After time point t2, new information ID3_RX of a following received piece of music may be received and stored temporarily, where the new information ID3_RX describes the current content of the audio signal A.

Figure 3:
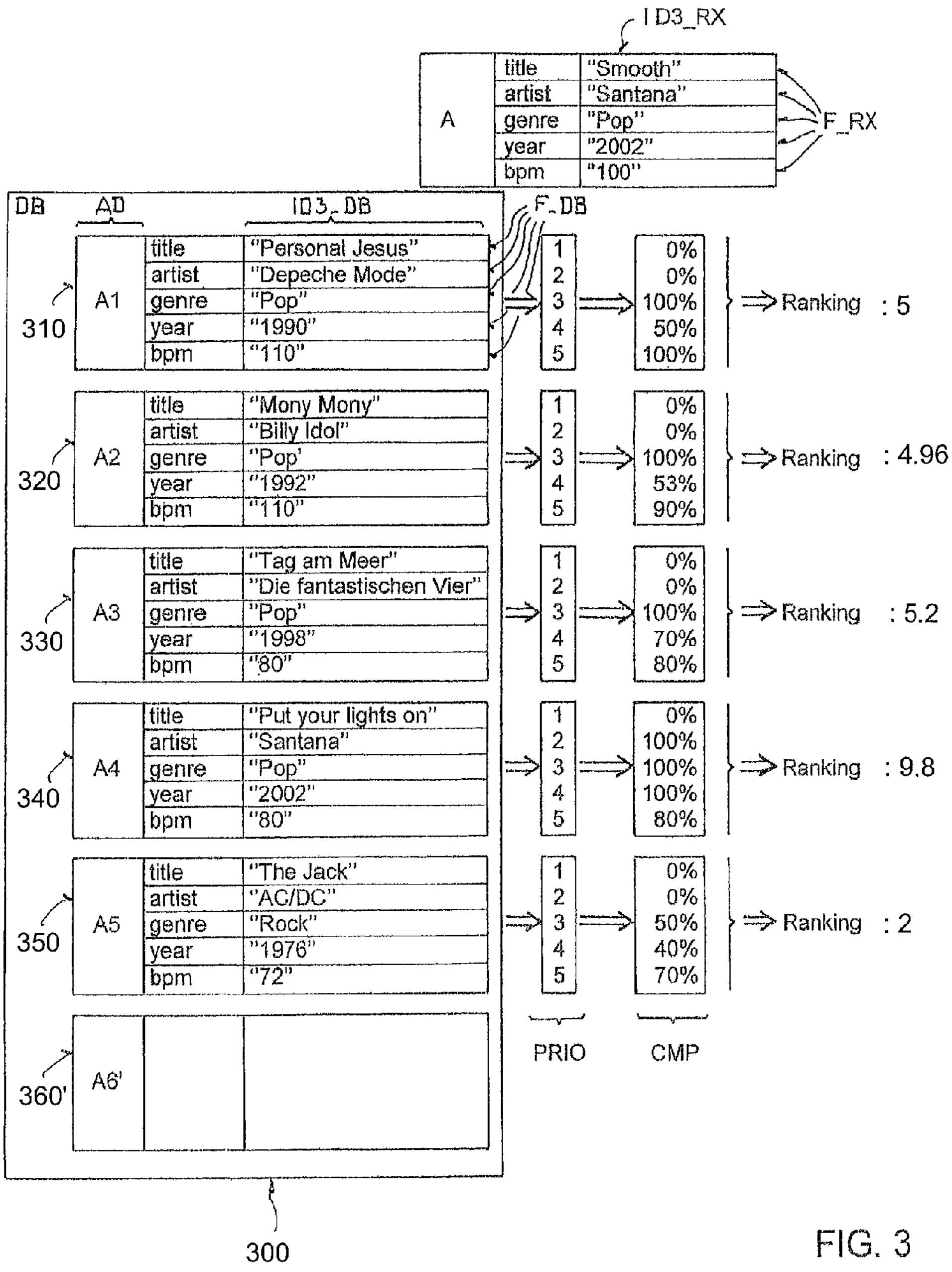
FIG. 3 is a schematic illustration of an example of an assignment by means of an evaluation of ID3 tags according to one implementation of the present invention.

FIG. 3 is a schematic illustration of the received information ID3_RX and entries 310 to 350 in database 300, and further illustrates an assignment according to one implementation of the present invention. The receive signal RF includes the audio signal A and the information ID3_RX associated with the currently received piece of music. As discussed above, the information ID3_RX describes the audio signal A. The information ID3_RX in FIG. 3 is formed as an ID3 tag. The ID3 tag may be in any suitable format, such as ID3v1, ID3v1.1, ID3v2, ID3v2.2, ID3v2.3, or ID3v2.4. In the present implementation shown in FIG. 3, the ID3 tag associated with the currently received piece of music includes the information fields F_RX, namely: "title," "artist," "genre," "year," and "bpm" (beats per minute), along with the corresponding entries: "Smooth," "Santana," "Pop," "2002," and "100." It will be understood that additional or different information fields may be included in the information ID3_RX.

The received information ID3_RX may be assigned by the arithmetic unit 200 (FIG. 1) to one or more database entries 310, 320, 330, 340 and 350 in DB 300. Each of the database entries 310, 320, 330, 340 and 350 include respective database fields F_DB which include data from an ID3 tag, for example. The database entries 310, 320, 330, 340 and 350 may be referred to herein as the content of the database 300. In the example illustrated in FIG. 3, a plurality of songs is contained in DB 300. Each song may be categorized according to content in an ID3 tag. In FIG. 3, the song titled "Smooth" is currently being received via the audio signal A. The first database entry 310 shows, for example, the database fields F_DB, namely: "title: Personal Jesus"; "artist: Depeche Mode"; "genre: Pop"; "year: 1990"; and "bpm: 100." Each database field in the database fields F_DB may correspond to previously received information ID3_RX by the receiving device 100. Each information field F_RX associated with the audio signal A may be compared with the corresponding database field F_DB in the database entry 310 by the arithmetic unit 200. If individual information fields F_RX are missing from the received information ID3_RX, a partial comparison may be made accordingly. The content of each database entry 310, 320, 330, 340 and 350 may be compared with the information ID3_RX. At least one database entry 310, 320, 330, 340 and 350 may be assigned to the information ID3_RX based on similarities between the information fields F_RX and the database fields F_RX.

The assignment of at least one database entry 310, 320, 330, 340 and/or 350 to the information ID3_RX may occur based on one or more comparison results CMP. The arithmetic unit 200 (FIG. 1) may determine a comparison result CMP in the form of a similarity value or the like. As illustrated in FIG. 3, the comparison results CMP may be indicated as similarities in %; e.g., a higher similarity results in a higher percentage. For database entry 310, the content of both the "title" database field F_DB and the "artist" database field F_DB are very different from the content in the corresponding "title" information field F_RX and "artist" information field F_RX associated with the currently received piece of music, so that a similarity of 0% results. In contrast, the contents of the "genre" and "bpm" database fields F_DB and the corresponding "genre" and "bpm" information fields F_RX are identical, so that a similarity of 100% results. The "year" database field F_DB and corresponding information field F_RX deviate by 12 years, so that a similarity of 50% may be calculated using a predetermined formula. The comparison results CMP may be calculated similarly for all other database entries 320, 330, 340 and 350. The comparison results CMP may be recalculated with newly received information ID3_RX associated with newly received pieces of music. In some implementations, the arithmetic unit 200 may be configured for continuous assignment; i.e., the assignment of at least one database entry in the database 300 to the information ID3_RX may be continuously updated during the reception of the receive signal RF so that for each piece of music received, a new assignment may be evaluated. Each new assignment may commence substantially immediately after the information fields F_RX of the received piece of music is output by the receiving circuit 100, 200, or 300 (FIG. 1). In some implementations, additional features, such as instruments used in the currently received piece of music, or rhythm of the audio signal A, may be determined from the audio signal A and compared with features of the audio data AD in the database 300 by the DSP 800 (FIG. 1) of the arithmetic unit 200. The arithmetic unit 200 may consider this additional comparison result in making an assignment.

In some implementations, the arithmetic unit 200, as best shown in FIG. 1, may be configured for evaluating (i.e., comparing the information ID3_RX to the content of the database 300) the information ID3_RX associated with the currently received piece of music during reception of the currently received piece of music; i.e., when the information ID3_RX is output from the receiving circuit 120 or 130 to the arithmetic unit 200. The arithmetic unit 200 may be configured for assigning the information to at least one database entry 310, 320, 330, 340 and 350 (FIG. 3) during reception of the current piece of music; e.g., before the entire current piece of music is received by the arithmetic unit 200. In this way, part of the audio signal A may be continuously buffered. In some implementations, a user may determine which information fields F_RX and database fields F_DB are evaluated.

As shown in FIG. 3, the arithmetic unit 200 (FIG. 1) may be configured for weighting information fields F_RX of the currently received piece of music and the associated database fields F_DB; i.e., a prioritization may be provided by means of prioritization (or "weighting") parameters (or "factors" or "properties") PRIO. The arithmetic unit 200 may be configured for carrying out the weighting of the information fields F_RX and the database fields F_DB in addition to carrying out the comparison of the information fields F_RX and the database fields F_DB. A particular comparison result CMP associated with a database field F_DB may be adjusted by means of the weighting parameters PRIO. In some implementations, the weighting parameters PRIO may be set by the user or the manufacturer. The weighting parameters PRIO may be adjustable by the user. For example, a user may weight certain information fields of an ID3 tag higher than other information fields. The arithmetic unit 200 may be configured for determining a rank (or "ranking") for each database entry 310, 320, 330, 340 and 350 based on the weighting parameters PRIO and the comparison results CMP, according to a predetermined formula. In the example implementation illustrated in FIG. 3, database entry 340 has the highest rank with a value of 9.8. The following formula may be utilized to calculate the rank for each data base entry 310, 320, 330, 340 and 350 in FIG. 3: "rank=Σ(6−PRIO)*CMP/100".

Continuing with the present example illustrated in FIG. 3, if a disturbance DIS of the reception of audio signal A occurs, cross-fading may be carried out to the associated audio data A4 in database entry 340 as a result of being assigned by the arithmetic unit 200 (FIG. 1) to the information ID3_RX. In some implementations, the exact point in time may be determined for both the received audio signal A and the associated audio data A4 such that inaudible cross-fading may occur. This determination may be made using a cross correlation algorithm, for example. If the reception of the audio signal A continues to be disturbed, the audio data A3 associated with database entry 330 (i.e., the next lower rank) may be played back after the play back of the audio data A4.

In some implementations, a ranking threshold may be provided. If the value of a specific ranking exceeds the ranking threshold, the information ID3_RX and the audio signal A of the receive signal RF may be added to database 300 as a new database entry 360' with the corresponding audio data A6' and database fields ID3_DB.

The invention is not limited to the implementations discussed above in conjunction with FIGS. 1 through 3. For example, it is possible to compare the audio signal A to the audio data in the database 300 by means of the DSP 300 in regard to clock speed or dynamics of the audio playback (not shown in the figures). It is also possible to compare other information fields and database fields, such as, for example, the album title or the composer. The functionality of the receiving device 100 according to FIG. 1 may be used with particular advantage in an infotainment system of a motor vehicle.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood, and is appreciated by persons skilled in the art, that one or more processes, sub-processes, or process steps described in connection with FIGS. 1-3 may be performed by hardware and/or software. If the process is performed by software, the software may reside in software memory (not shown) in a suitable electronic processing component or system such as, one or more of the functional components or modules schematically depicted in FIGS. 1-3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A receiving device for mobile reception of a receive signal comprising an audio signal of a currently received piece of music, the receiving device comprising:

a receiving circuit configured for receiving the receive signal and outputting the audio signal and information associated with the audio signal, where the information includes at least one information field describing the currently received piece of music;

an arithmetic unit configured for evaluating the information associated with the audio signal; and a database configured for storing database entries, where each database entry includes at least one data field and associated audio data;

where the arithmetic unit is configured for assigning the information to at least one database entry by comparing the at least one information field to the at least one data field; and where the arithmetic unit is configured for outputting the audio data of the assigned database entry for playback by the receiving device based on a detected disturbance in the reception of the audio signal of the currently received piece of music.

2. The receiving device of claim 1, where the database includes an external database in communication with the arithmetic unit.

3. The receiving device of claim 1, where the arithmetic unit is configured for cross-fading from the audio signal associated with the currently received piece of music to the audio data of the assigned database entry.

4. The receiving device of claim 1, where the arithmetic unit is configured for switching from the audio signal associated with the currently received piece of music to the audio data of the assigned database entry.

5. The receiving device of claim 1, where the arithmetic unit is configured for detecting the disturbance of the reception of the audio signal.

6. The receiving device of claim 1, where the receiving circuit is configured for detecting the disturbance of the reception of the audio signal.

7. The receiving device of claim 1, where the arithmetic unit is configured for assigning the information to the assigned database entry as the audio signal is transmitted from the receiving circuit to the arithmetic unit.

8. The receiving device of claim 1, where the arithmetic unit is configured for calculating an inaudible fading via a fading algorithm when a piece of music that is substantially identical to the currently received piece of music is present in the audio data of the assigned database entry.

9. The receiving device of claim 1, where the arithmetic unit comprises a digital signal processor and a central processing unit.

10. The receiving device of claim 1, where the receiving circuit comprises a receiver selected from the group consisting of: a VHF receiver; a DAB receiver; a UMTS receiver; and two or more of the foregoing.

11. The receiving device of claim 1, where the information comprises an ID3 tag or RDS data.

12. The receiving device of claim 1, where the at least one information field is selected from the group consisting of: title; artist; genre; year; beats per minute (bpm); and two or more of the foregoing.

13. A method for playback in a mobile receiver, comprising:

receiving a receive signal via a receiving circuit, the receive signal comprising an audio signal of a currently received piece of music and information associated with the audio signal, the information comprising at least one information field describing the currently received piece of music;

assigning at least one database entry in a database to the information by comparing the at least one information field to the content of the at least one database entry, where each database entry comprises at least one data field and associated audio data;

detecting a disturbance in the reception of the audio signal of the currently received piece of music; and outputting the audio data from the assigned database entry for playback by the mobile receiver at least during the disturbance.

14. The method of claim 13, where outputting the audio data from the assigned database entry comprises cross-fading from the audio signal associated with the currently received piece of music to the audio data of the assigned database entry.

15. The method of claim 13, where outputting the audio data from the assigned database entry comprises switching from the audio signal associated with the currently received piece of music to the audio data of the assigned database entry.

16. The method of claim 13, where assigning at least one database entry in the database to the information occurs via an arithmetic unit as the audio signal is transmitted from the receiving circuit to the arithmetic unit.

17. The method of claim 13, comprising calculating an inaudible fading via a fading algorithm of an arithmetic unit when a piece of music that is substantially identical to the currently received piece of music is present in the audio data of the assigned database entry.

18. The method of claim 13, where assigning at least one database entry in the database to the information occurs based on the results of comparing a plurality of information fields with a corresponding plurality of data fields.

19. The method of claim 18, where assigning at least one database entry in the database to the information further comprises ranking a plurality of database entries based on the comparison results.

20. The method of claim 13, where assigning at least one database entry in the database to the information comprises applying a weighting factor to each information field and applying a weighting factor to each corresponding data field.

21. The method of claim 20, where assigning at least one database entry in the database to the information further comprises ranking a plurality of database entries based on applying the weighting factors.

22. The method of claim 13, further comprising adding the information and the audio signal of the receive signal to the database as a new database entry with corresponding audio data when a ranking threshold is exceeded by a specific database entry as a result of ranking a plurality of database entries in the database.

23. The method of claim 13, where detecting a disturbance in the reception of the audio signal comprises determining a quality of the receive signal or a quality of the audio signal and comparing the determined quality with a quality threshold.

24. The method of claim 13, where assigning the at least one database entry in the database to the information is continuously updated as the audio signal is transmitted from the receiving circuit to an arithmetic unit.

25. The method of claim 13, where outputting the audio data from the assigned database entry comprises adjusting the audio data to a current rhythm or beats per minute of the audio signal.

* * * * *